(12) United States Patent
Park et al.

(10) Patent No.: US 9,479,628 B2
(45) Date of Patent: Oct. 25, 2016

(54) MOBILE TERMINAL AND CONTROL METHOD THEREOF

(71) Applicant: LG ELECTRONICS INC., Seoul (KR)

(72) Inventors: Jungmin Park, Seoul (KR); Dami Choe, Seoul (KR); Hyungsup Kim, Seoul (KR); Wonseok Joung, Seoul (KR); Yongkyoung Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 377 days.

(21) Appl. No.: 13/944,623

(22) Filed: Jul. 17, 2013

(65) Prior Publication Data

US 2014/0253474 A1 Sep. 11, 2014

(30) Foreign Application Priority Data

Mar. 6, 2013 (KR) ........................ 10-2013-0024064

(51) Int. Cl.
| | |
|---|---|
| *G06F 3/041* | (2006.01) |
| *G09G 5/00* | (2006.01) |
| *G06F 3/048* | (2013.01) |
| *H04M 1/725* | (2006.01) |
| *G06F 3/0482* | (2013.01) |
| *G06F 3/0488* | (2013.01) |

(52) U.S. Cl.
CPC ........ *H04M 1/72519* (2013.01); *G06F 3/0482* (2013.01); *G06F 3/04883* (2013.01); *G06F 2203/04807* (2013.01); *H04M 2250/22* (2013.01)

(58) Field of Classification Search
CPC .. G06F 3/04883; G06F 3/017; G06F 3/0482; G06F 2203/04807; G06K 2209/01; G06K 9/2054; G06K 9/2081; G06K 9/222; H04M 1/72519; H04M 2250/22
USPC .................................................. 345/156–178
See application file for complete search history.

(56) References Cited

U.S. PATENT DOCUMENTS

| | | | | |
|---|---|---|---|---|
| 2005/0022130 A1* | 1/2005 | Fabritius | ................. | G06F 3/038 715/739 |
| 2005/0034080 A1* | 2/2005 | Jaeger | ................... | G06F 3/0481 715/767 |
| 2008/0294982 A1* | 11/2008 | Leung | ................... | G06F 17/276 715/261 |
| 2010/0262591 A1* | 10/2010 | Lee | ...................... | G06F 3/04883 707/706 |
| 2012/0030624 A1* | 2/2012 | Migos | ................... | G06F 3/0482 715/830 |
| 2013/0191373 A1* | 7/2013 | Kaul | ................. | G06F 17/30522 707/722 |

\* cited by examiner

*Primary Examiner* — Amit Chatly
(74) *Attorney, Agent, or Firm* — Birch, Stewart, Kolasch & Birch, LLP

(57) ABSTRACT

The present disclosure relates to a mobile terminal configured to detect a touch input and a control method thereof. A mobile terminal according to an embodiment of the present disclosure may include a display unit formed to detect a touch input and display screen information; and a controller configured to display graphic data corresponding to the track of a touch input sensed at the display unit on the display unit and detect the attribute information of the graphic data, wherein the controller selects at least a partial region of the screen information based on a region displayed with the graphic data, and executes a function matched to the detected attribute information for the selected region.

5 Claims, 17 Drawing Sheets

MOBILE TERMINAL AND CONTROL METHOD THEREOF

RELATED APPLICATION

Pursuant to 35 U.S.C. §119(a), this application claims the benefit of earlier filing date and right of priority to Korean Application No. 10-2013-0024064, filed on Mar. 6, 2013, the contents of which is incorporated by reference herein in its entirety.

BACKGROUND OF THE INVENTION

1. Field of the Invention

The present disclosure relates to a mobile terminal, and more particularly, to a mobile terminal configured to detect a touch input and a control method thereof.

2. Description of the Related Art

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, the improvement of structural or software elements of the terminal may be taken into consideration to support and enhance the functions of the terminal.

On the other hand, the terminal may display screen information on the display unit. The screen information may include at least one of text data and image data. However, when the user wants to execute a search function associated with screen information in a state that he or she views the screen information, several steps of processes may be carried out to execute an additional search application, thereby causing inconvenience that several seconds are consumed.

SUMMARY OF THE INVENTION

An objective of the present disclosure is to provide a mobile terminal and control method thereof capable of enhancing the user's convenience when performing a multitasking function.

A mobile terminal according to an embodiment of the present disclosure may include a display unit formed to detect a touch input and display screen information; and a controller configured to display graphic data corresponding to the track of a touch input sensed at the display unit on the display unit and detect the attribute information of the graphic data, wherein the controller selects at least a partial region of the screen information based on a region displayed with the graphic data, and executes a function matched to the detected attribute information for the selected region.

According to an embodiment, the controller may analyze the track of the touch input as digital data, and display graphic data corresponding to the digital data on the display unit.

According to an embodiment, the controller may select text data as a region for executing the function when the digital data corresponds to the text data, and select text data contained in a region displayed with the digital data from the screen information as a region for executing the function when the digital data does not correspond to the text data.

According to an embodiment, the controller may select new screen information displayed on the display unit as a region for executing the function as expanding the screen information when the screen information is expanded based on a touch input applied to the display unit.

According to an embodiment, the controller may execute a function matched to preset attribute information for the selected region when the attribute information of the graphic data corresponds to the preset attribute information, and the attribute information of the graphic data may include at least one of the color, pattern, shape, thickness and transparency of the graphic data.

According to an embodiment, the display unit may display an icon corresponding to an intelligent agent (IA) in a region displayed with a status display line, and the controller may execute a function matched to a color when the color of the graphic data is the same as that of the icon corresponding to the intelligent agent.

According to an embodiment, the controller may execute a search function for the text data, and display a search result in one region of the display unit.

According to an embodiment, the controller may terminate the graphic data corresponding to the track of the touch input being displayed on the display unit while displaying the search result in one region of the display unit.

According to an embodiment, when a touch input is sensed on the search result, the controller may insert at least part of the search result into the screen information based on the sensed touch input.

According to an embodiment, the controller may select a plurality of objects based on a region displayed with the graphic data and group the selected plurality of objects as at least one group, and display an indicator indicating that the selected plurality of objects are grouped along with the selected plurality of objects.

According to an embodiment, the controller may select the plurality of objects based on a plurality of graphic data displayed on the plurality of objects, respectively, and group the selected plurality of objects.

According to an embodiment, the controller may group the selected plurality of objects when a region contained in graphic data displayed on the screen information contains the plurality of objects.

According to an embodiment, the controller may generate an application corresponding to the group, and allow content contained in the selected plurality of objects, respectively, to be contained in information associated with the application.

According to an embodiment, when a preset touch input is sensed on at least one of the selected plurality of objects, the controller may display information associated with content contained in the touched object on the display unit.

According to an embodiment, the mobile terminal may further include a terminal body; and a wireless communication unit formed to collect at least one of the location information and current time information of the body, wherein the controller infers current situation information based on at least one of the location information and the time information, and extracts a content associated with preset situation information from contents contained in information associated with the application when the current situation information corresponds to the preset situation information.

A control method of a mobile terminal according to an embodiment of the present disclosure may include displaying screen information on the display unit; displaying graphic data corresponding to the track of a touch input sensed at the display unit on the display unit; detecting the attribute information of the graphic data; selecting at least a partial region of the screen information based on a region displayed with the graphic data; and executing a function matched to the detected attribute information for the selected region.

According to an embodiment, said displaying graphic data corresponding to the track of a touch input sensed at the display unit on the display unit may include analyzing the track of the touch input as digital data; and displaying graphic data corresponding to the digital data on the display unit.

According to an embodiment, said selecting at least a partial region of the screen information based on a region displayed with the graphic data may include selecting text data as a region for executing the function when the digital data corresponds to the text data; and selecting text data contained in a region displayed with the digital data from the screen information as a region for executing the function when the digital data does not correspond to the text data.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
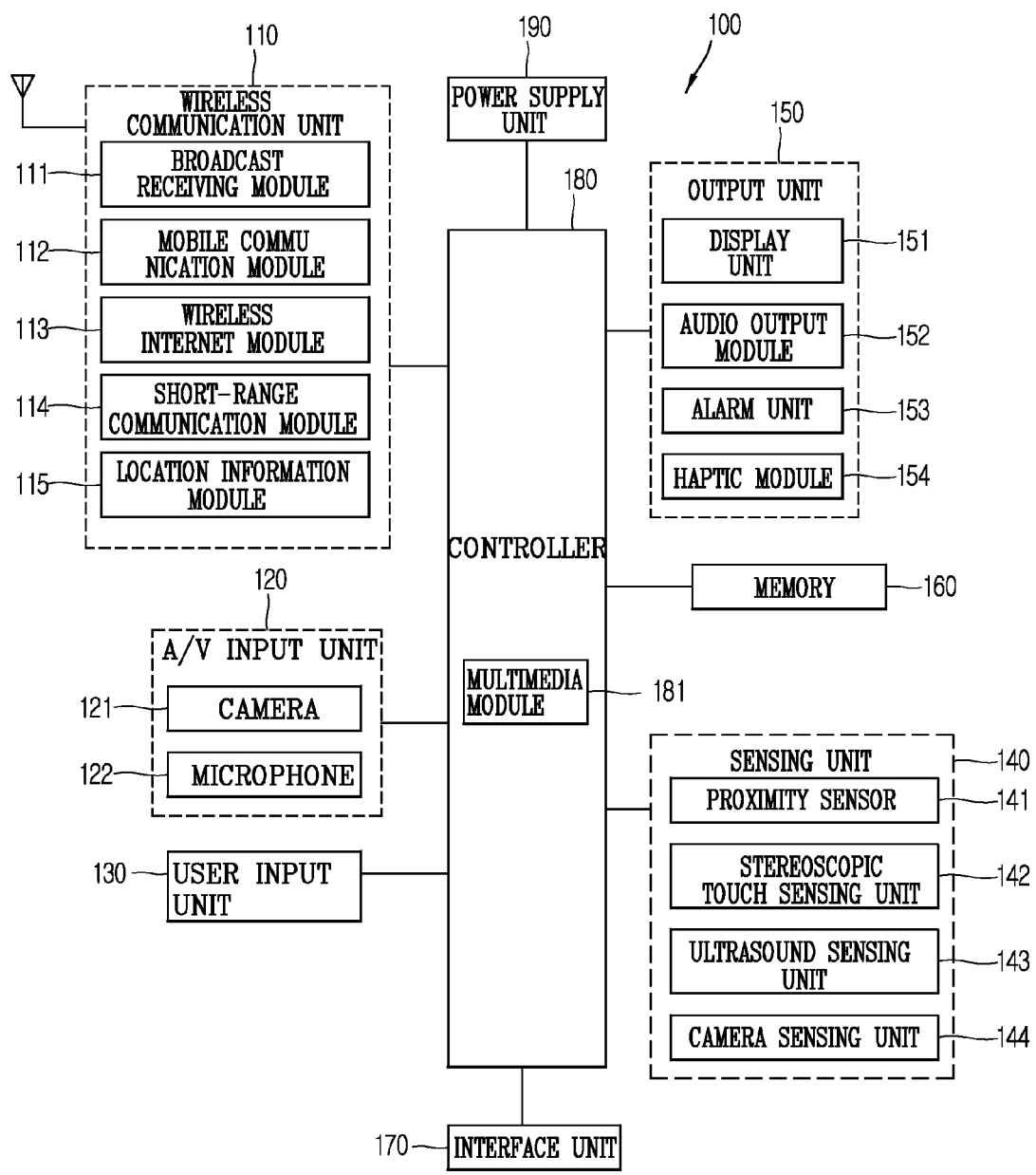
FIG. 1 is a block diagram illustrating a mobile terminal according to an embodiment disclosed in the present disclosure.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention.

A mobile terminal disclosed herein may include a portable phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement an video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (WiFI) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

Furthermore, the display unit 151 may be configured with a stereoscopic display unit 152 for displaying a stereoscopic image.

Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit (not shown). The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, a ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound.

For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor.

For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

For another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the user's control command input to applications when the state of the mobile terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Next, a communication system that can be implemented through the mobile terminal 100 according to the present disclosure will be described.

Figure 2A:
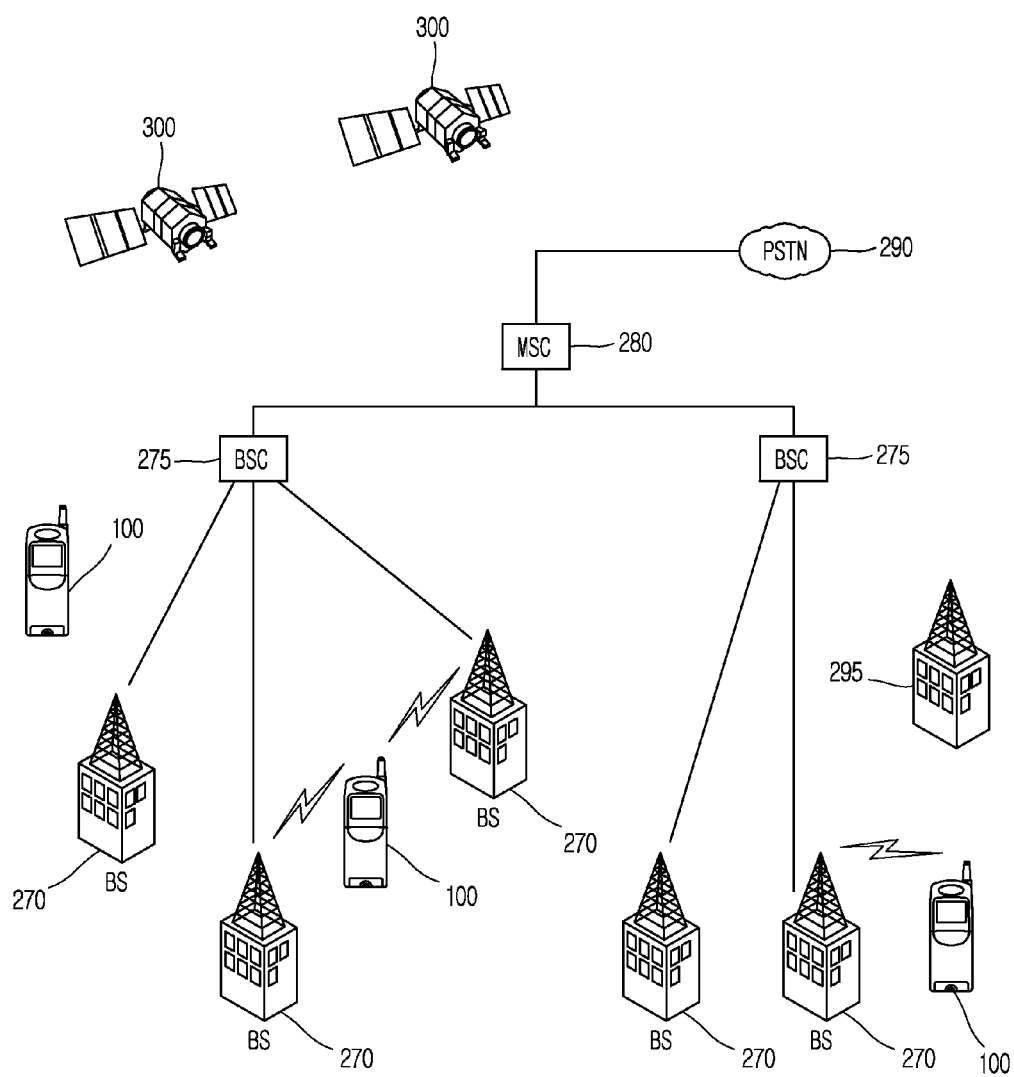
FIGS. 2A and 2B are conceptual views illustrating a communication system in which a mobile terminal according to the present disclosure is operable.
Figure 2B:
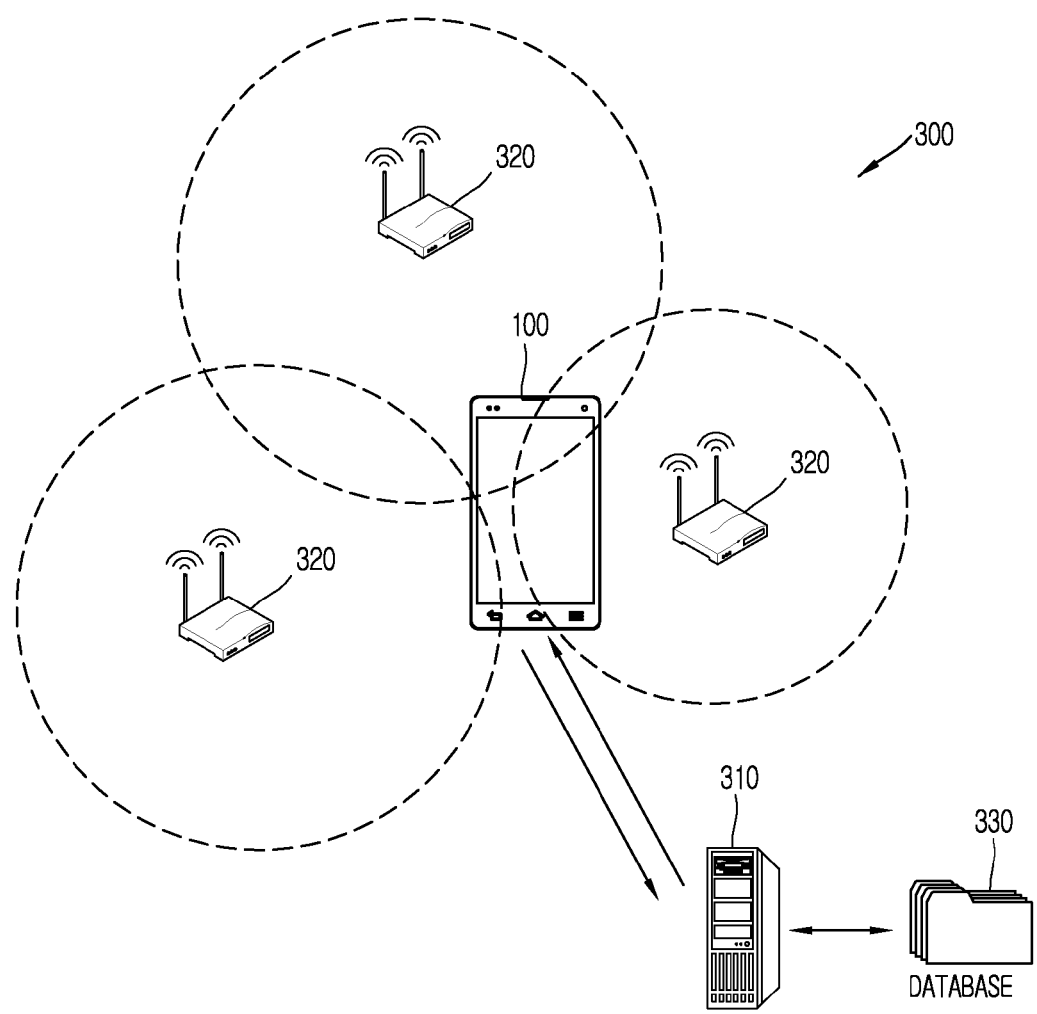

FIGS. 2A and 2B are conceptual views illustrating a communication system in which a mobile terminal 100 according to the present disclosure is operable.

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, it is apparent that the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this case, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, he mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Hereinafter, a mobile terminal according to an embodiment of the present disclosure as illustrated in FIG. 1 or a mobile terminal disposed with the constituent elements of the mobile terminal or the structure of a mobile terminal will be described.

Figure 3A:
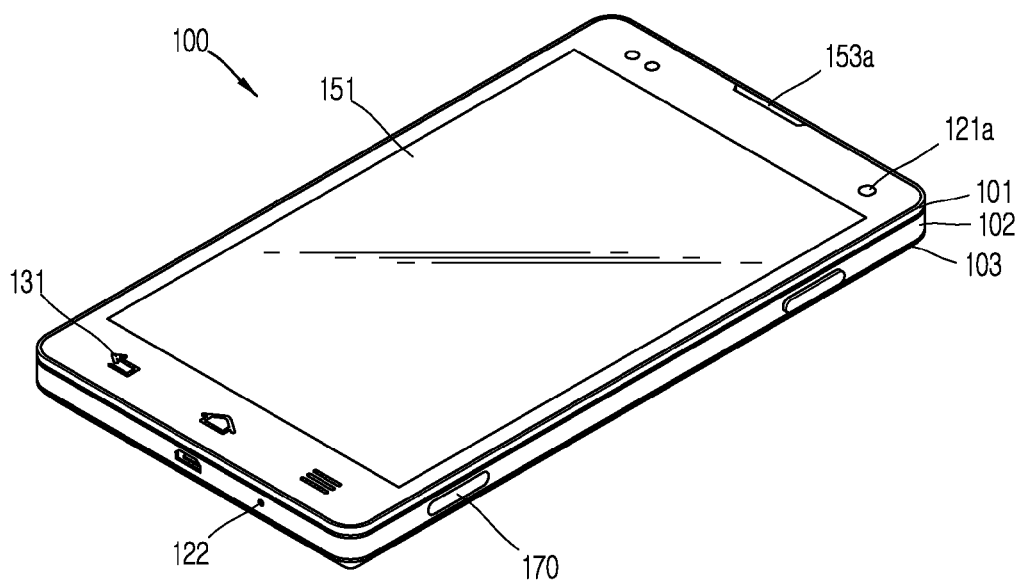
FIG. 3A is a front perspective view illustrating an example of a mobile terminal associated with the present disclosure.

FIG. 3A is a front perspective view illustrating an example of the mobile terminal 100 associated with the present disclosure.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
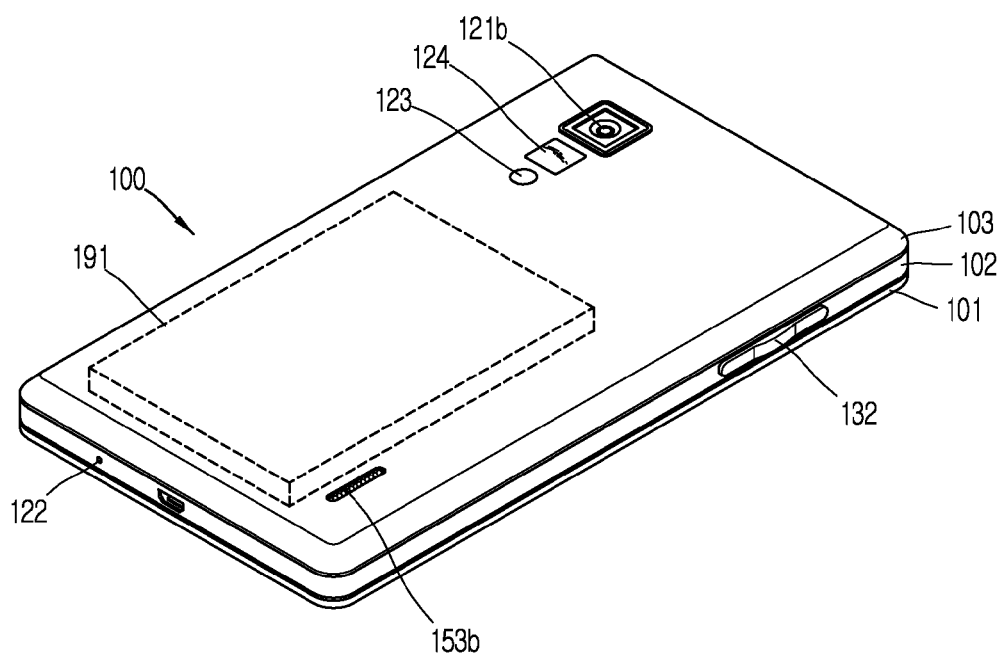
FIG. 3B is a rear perspective view illustrating a mobile terminal illustrated in FIG. 3A.

FIG. 3B is a rear perspective view illustrating mobile terminal 100 illustrated in FIG. 3A.

Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

On the other hand, the mobile terminal 100 may display screen information on the display unit 151. The screen information may include at least one of text data and image data. However, when the user wants to execute a search function associated with screen information in a state that he or she views the screen information, several steps of processes may be carried out to execute an additional search application, thereby causing inconvenience that several seconds are consumed.

Accordingly, hereinafter, a mobile terminal 100 capable of enhancing the user's convenience when performing a multitasking function and a control method thereof will be described with reference to the accompanying drawings.

Figure 4:
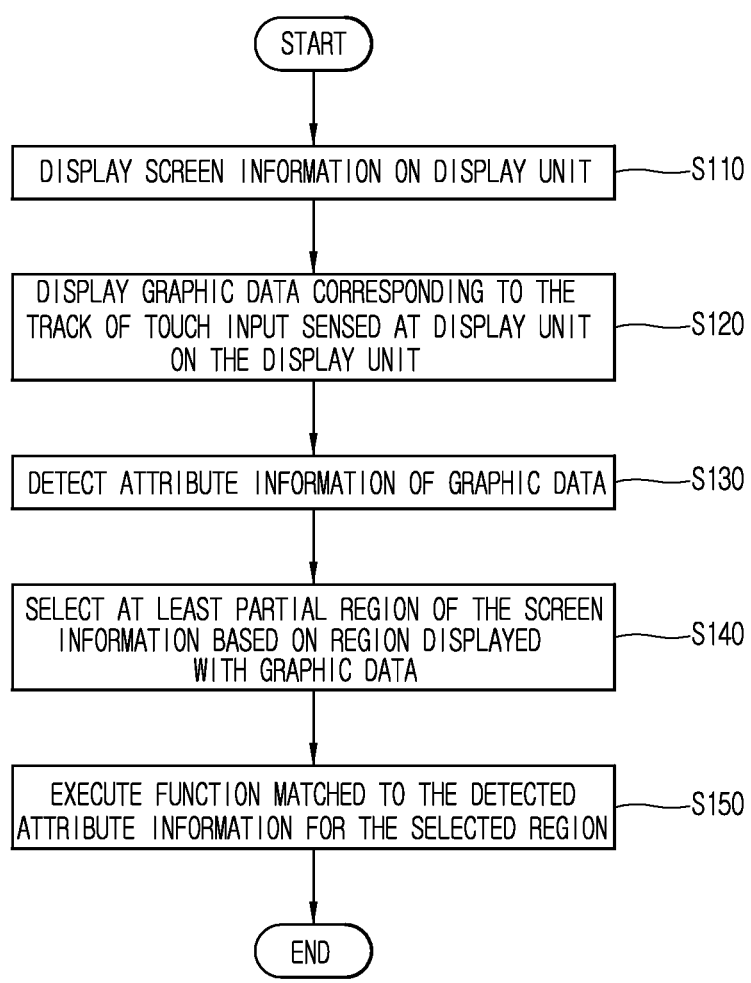
FIG. 4 is a flow chart for explaining a mobile terminal according to an embodiment of the present disclosure.

FIG. 4 is a flow chart for explaining the mobile terminal 100 (refer to FIG. 1) according to an embodiment of the present disclosure. The mobile terminal 100 may include a display unit 151 (refer to FIG. 1) and a controller 180 (refer to FIG. 1).

Referring to FIG. 4, first, the process (S110) of displaying screen information on the display unit 151 is carried out.

At least one of a home screen, a lock screen or an execution screen for an application may be displayed on the display unit 151. Furthermore, at least one of a page containing an image or text, a web page, an e-mail, an e-document and social networking service (SNS) content may be displayed on the display unit 151. Here, screen information denotes all information displayed on at least a partial region of the display unit 151.

Next, the process (S120) of displaying graphic data corresponding to the track of a touch input sensed at the display unit 151 on the display unit 151 and the process (S130) of detecting the attribute information of graphic data are carried out.

The display unit 151 is configured that it can detect a touch input applied thereto by a user. The user may apply a touch input to the display unit 151 using a stylus pen or apply a touch input to the display unit 151 using his or her finger or the like. The controller 180 may interpret the track of the touch input as digital data, and display graphic data corresponding to the digital data on the display unit 151.

The controller 180 may detect the attribute information of graphic data. Here, the attribute information of graphic data may include at least one of the color, pattern, shape, thickness and transparency information of the graphic data. Furthermore, two or more of the foregoing information may be used for the attribute information of the graphic data.

Hereinafter, the process (S140) of selecting at least a partial region of screen information based on a region displayed with graphic data is carried out.

When digital data corresponds to text data, the controller 180 may select text data as a region for executing a function.

On the other hand, when digital data does not correspond to text data, the controller 180 may specify a separate region on screen information. Specifically, the controller 180 may trace the track of a touch input sensed on screen information, and specify a region on the screen information based on the track of the touch input. Meanwhile, the controller 180 may specify a region on the screen information based on the start position and release position of a touch input sensed on the screen information. Furthermore, the controller 180 may specify part of screen information contained in a region displayed with digital data on the screen information as a region for executing a function.

The controller 180 may display the specified region to be distinguished from the other region of the screen information. For example, the controller 180 may display a border line of the specified region on the display unit 151. Furthermore, the controller 180 may draw a specific color within the specified region.

Next, the process (S150) of executing a function matched to the detected attribute information for the selected region is carried out.

When the attribute information of graphic data corresponds to preset attribute information, the controller 180 may execute a function matched to preset attribute information for the selected region.

For example, when the attribute information of graphic data corresponds to attribute information associated with a search function, the controller 180 may execute a search function for text data contained in the selected region, and display a search region in one region of the display unit 151.

As described above, according to the present disclosure, the mobile terminal 100 may display graphic data corresponding to the track of a touch input sensed at the display unit 151 on the display unit 151, and immediately execute a function matched to attribute information based on the attribute information of the graphic data. In other words, an entry path for executing various functions may be provided with a unified control action in a state that any screen information is displayed on the display unit 151. Accordingly, the user may use a search function or the like even without performing a complicated manipulation during the multitasking process. As a result, it may be possible to enhance the user's convenience.

Figure 5:
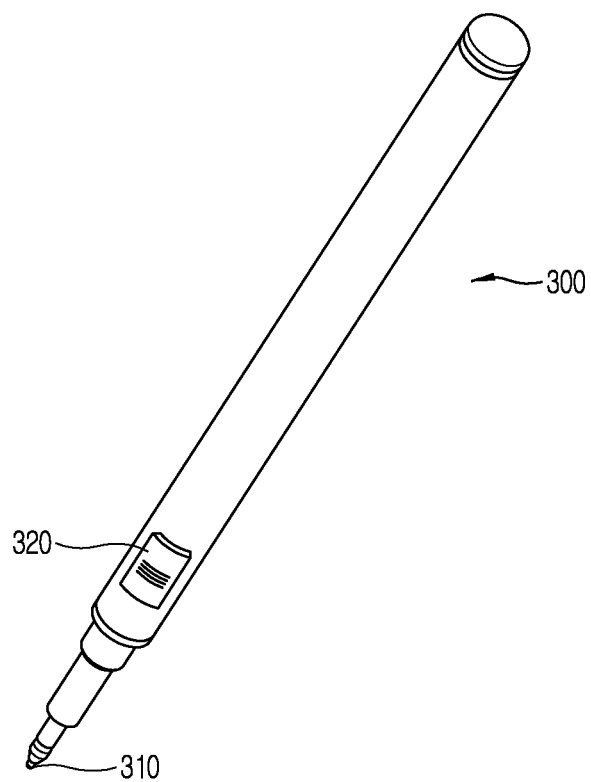
FIG. 5 is a conceptual view illustrating a touch unit in which a touch input is applied to the mobile terminal according to the present disclosure.
Figure 6:
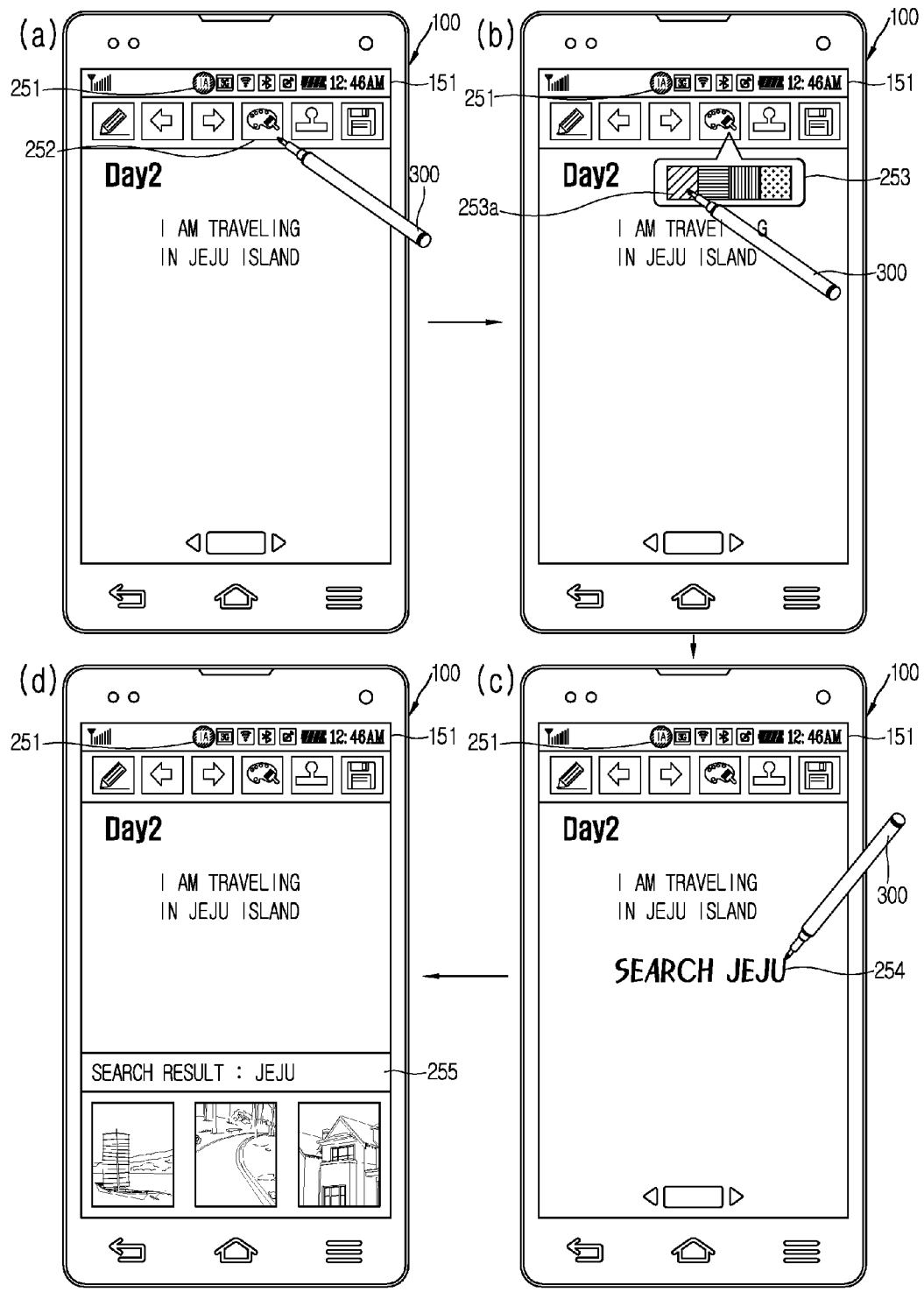
FIGS. 6 through 9 are conceptual views illustrating a user interface in which a function matched to the attribute information of graphic data is executed.

FIG. 5 is a conceptual view illustrating a touch unit in which a touch input is applied to the mobile terminal 100 according to the present disclosure.

A touch unit 300 is an input tool with a pen shape for entering a control command to the display unit 151 formed to enable a reception of a touch input, and may be referred to as a touch pen, a stylus pen or the like.

The touch unit 300 may apply a touch input to the display unit 151 using at least one of a capacitive touch scheme and a resistive touch scheme according to the properties of a touch pad contained in the display unit 151.

Furthermore, the touch unit 300 may include a color recognition unit 310 including a color recognition sensor. Though not shown in the drawing, the touch unit 300 may include an activation button for activating the color recognition unit 310 and a short-range communication module for transmitting or receiving radio signals to or from the mobile terminal 100.

Here, the short-range communication module of the touch unit 300 may communicate with the mobile terminal 100 using at least one of various short-range communication schemes such as Bluetooth, Radio Frequency IDentification (RFID), ZigBee, and the like.

FIGS. 6 through 9 are conceptual views illustrating a user interface in which a function matched to the attribute information of graphic data is executed.

The present disclosure may be carried out using an intelligent agent (IA). The display unit 151 according to the present disclosure may be formed to detect a touch input, and according to all embodiments of the present disclosure, the user may apply a touch input to the display unit 151 using a stylus pen 300, or apply a touch input to the display unit 151 using his or her finger or the like.

Referring to FIG. 6A, the display unit 151 may display screen information. As illustrated in the drawing, the display unit 151 may display an execution screen for an electronic note application as screen information. Though not shown in the drawing, the display unit 151 may display a home screen, a lock screen and the like as screen information.

The display unit 151 may be formed to detect a touch input. As described above, the user may apply a touch input to the display unit 151 using a stylus pen 300, or apply a touch input to the display unit 151 using his or her finger or the like. To this end, the user may select a pen tool of the touch unit 300, and apply a touch input using the selected pen tool.

Specifically, the display unit 151 may display an icon (hereinafter, referred to as a "color select icon") 252 corresponding to a function for selecting the color of graphic data. When the color select icon 252 is selected, the controller 180 may display icons 253 corresponding to a plurality of colors, respectively, as illustrated in FIG. 6B.

When any one 253a of the icons 253 corresponding to a plurality of colors, respectively, is selected, the controller 180 may display graphic data 254 corresponding to the track of a touch input of the stylus pen 300 with the selected color on the display unit 151. Though not shown in the drawing, the graphic data 254 illustrated in FIG. 6C may have a color corresponding to the selected icon 253a.

As illustrated in the drawing, when the graphic data 254 corresponds to text data (for example, Search Jeju), the controller 180 may analyze the text data.

Furthermore, the controller 180 may detect a color as the received attribute information of the graphic data 254. When the color of the graphic data 254 is the same as a preset color, namely, when the color of the graphic data 254 is the same as that of an icon (hereinafter, referred to as an "IA icon")

251 corresponding to the intelligent agent (IA), the controller 180 may execute a function (for example, search function) matched to the color for the text data.

Hereinafter, referring to FIG. 6D, the controller 180 may execute a search function for text data corresponding to the graphic data 254, and display the search result 255 in one region of the display unit 151.

On the other hand, as illustrated in the drawing, the controller 180 may terminate the graphic data 254 being displayed on the display unit 151 while displaying the search result 255 in one region of the display unit 151. Though not shown in the drawing, the search result 255 may be displayed on the display unit 151 while the graphic data 254 is continuously displayed on the display unit 151.

Figure 7:
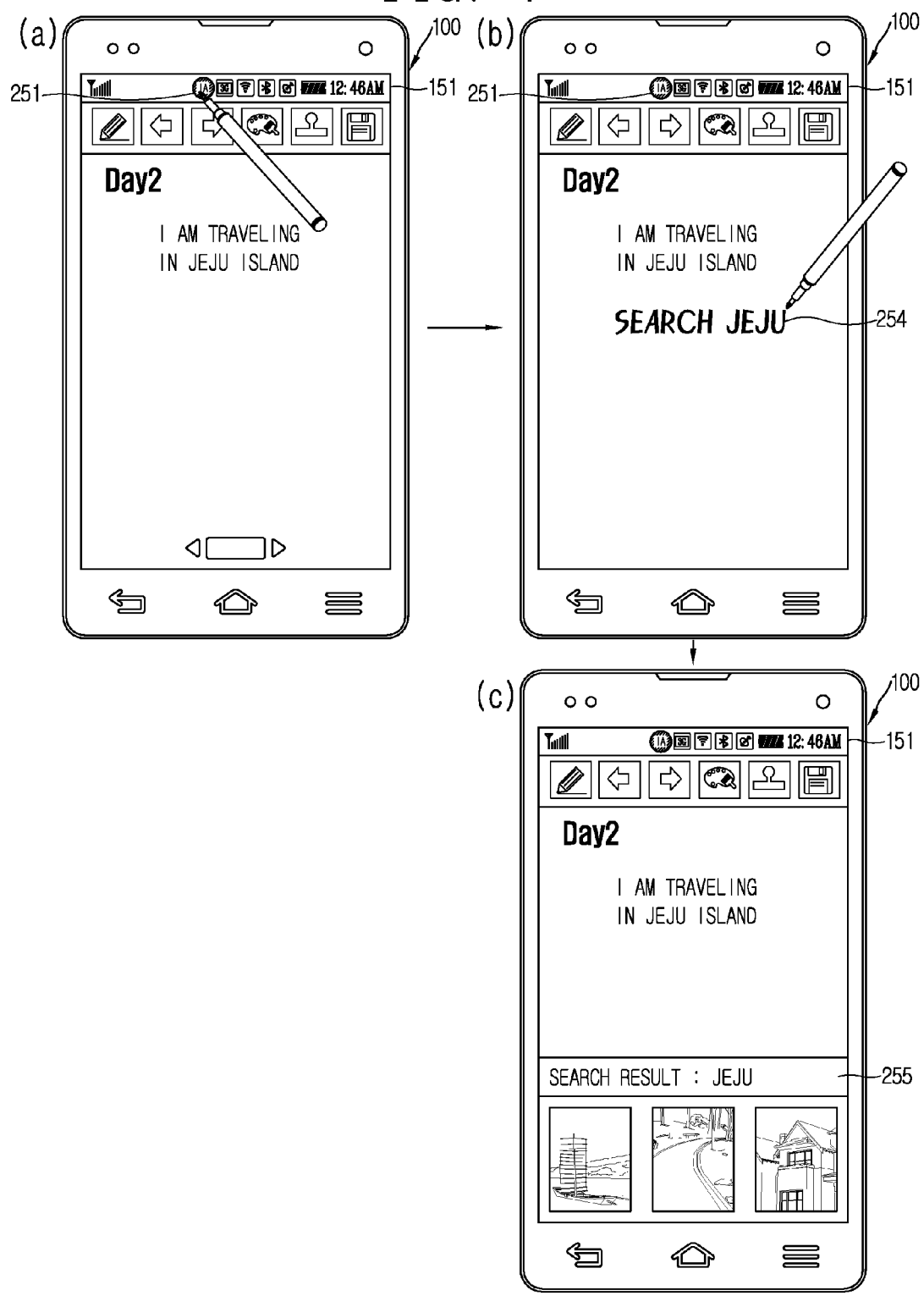

Referring to FIG. 7, the mobile terminal 100 may perform the foregoing control command even though a color is not selected from the pen tool.

Specifically, referring to FIG. 7A, the status display line of the display unit 151 may display an IA icon 251. The IA icon 251 may be displayed with a preset color on the status display line.

At this time, when a touch input through the stylus pen 300 is sensed on the IA icon 251, referring to FIG. 7B, the controller 180 may display the graphic data 254 corresponding to the track of the touch input of the stylus pen 300 with the same color as that of the IA icon 251 on the display unit 151.

Then, referring to FIG. 7C, the controller 180 may execute a function (for example, search function) matched to the color of the IA icon 251 for text data corresponding to the graphic data 254. Accordingly, the controller 180 may execute a search function for text data corresponding to the graphic data 254, and display the search result 255 in one region of the display unit 151.

Figure 8:
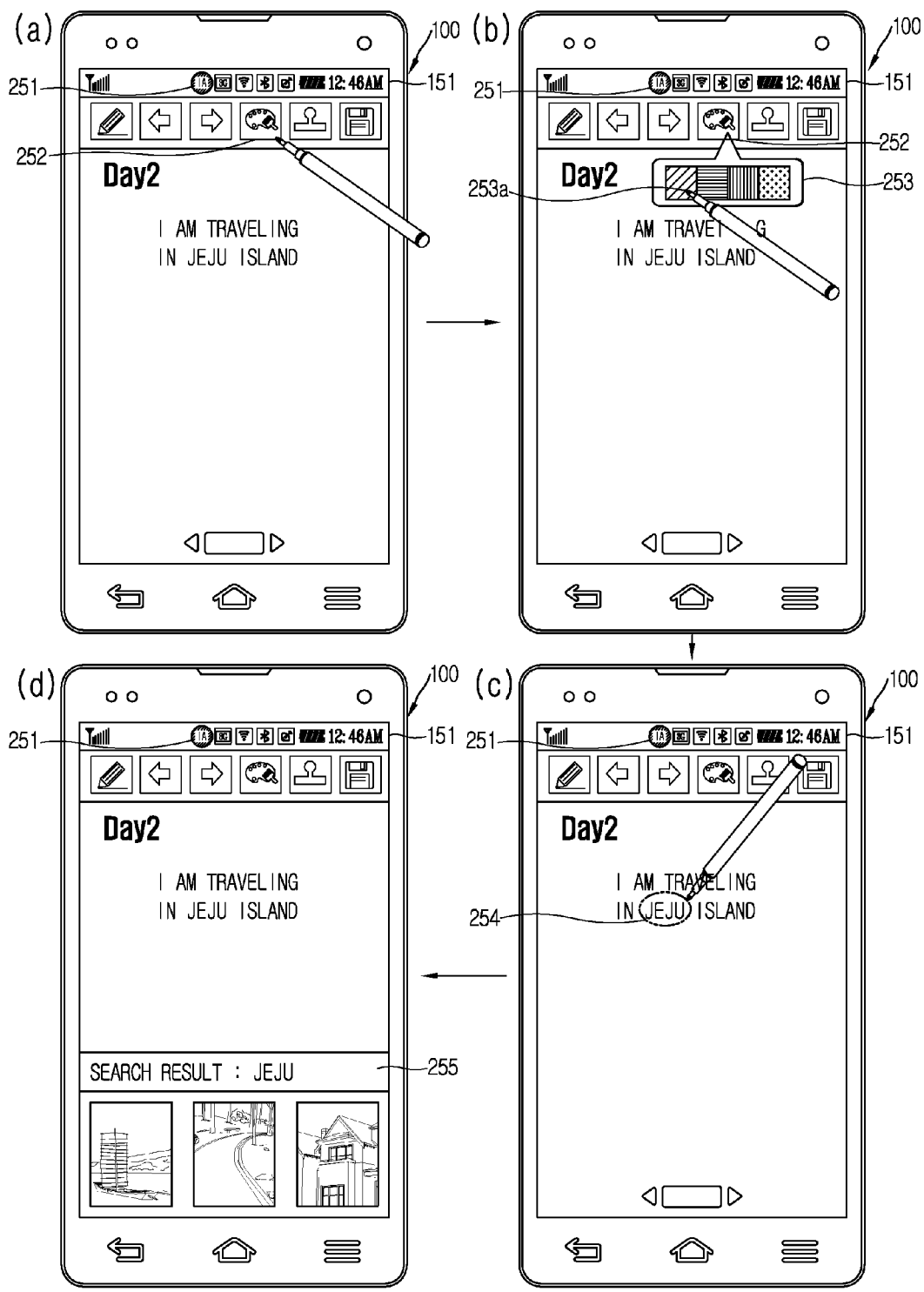

Referring to FIG. 8, the mobile terminal 100 may perform the foregoing control command even though the track of a touch input does not correspond to text data.

Specifically, referring to FIGS. 8A and 8B, when the color select icon 252 is selected, the controller 180 may display icons 253 corresponding to a plurality of colors, respectively.

At this time, when any one 253a of the icons 253 corresponding to a plurality of colors, respectively, is selected, as illustrated in FIG. 8C, the controller 180 may display the graphic data 254 corresponding to the track of a touch input of the stylus pen 300 with the selected color on the display unit 151.

As illustrated in the drawing, the graphic data 254 may not correspond to text data. In this case, the controller 180 may select text data (for example, Jeju) contained in a region displayed with the graphic data 254 from the screen information.

Then, the controller 180 may detect a color as the received attribute information of the graphic data 254. When the color of the graphic data 254 is the same as that of the IA icon 251, the controller 180 may execute a function (for example, search function) matched to the color for the text data.

Then, referring to FIG. 8D, the controller 180 may execute a search function for text data contained in a region displayed with the graphic data 254, and display the search result 255 in one region of the display unit 151.

Figure 9:
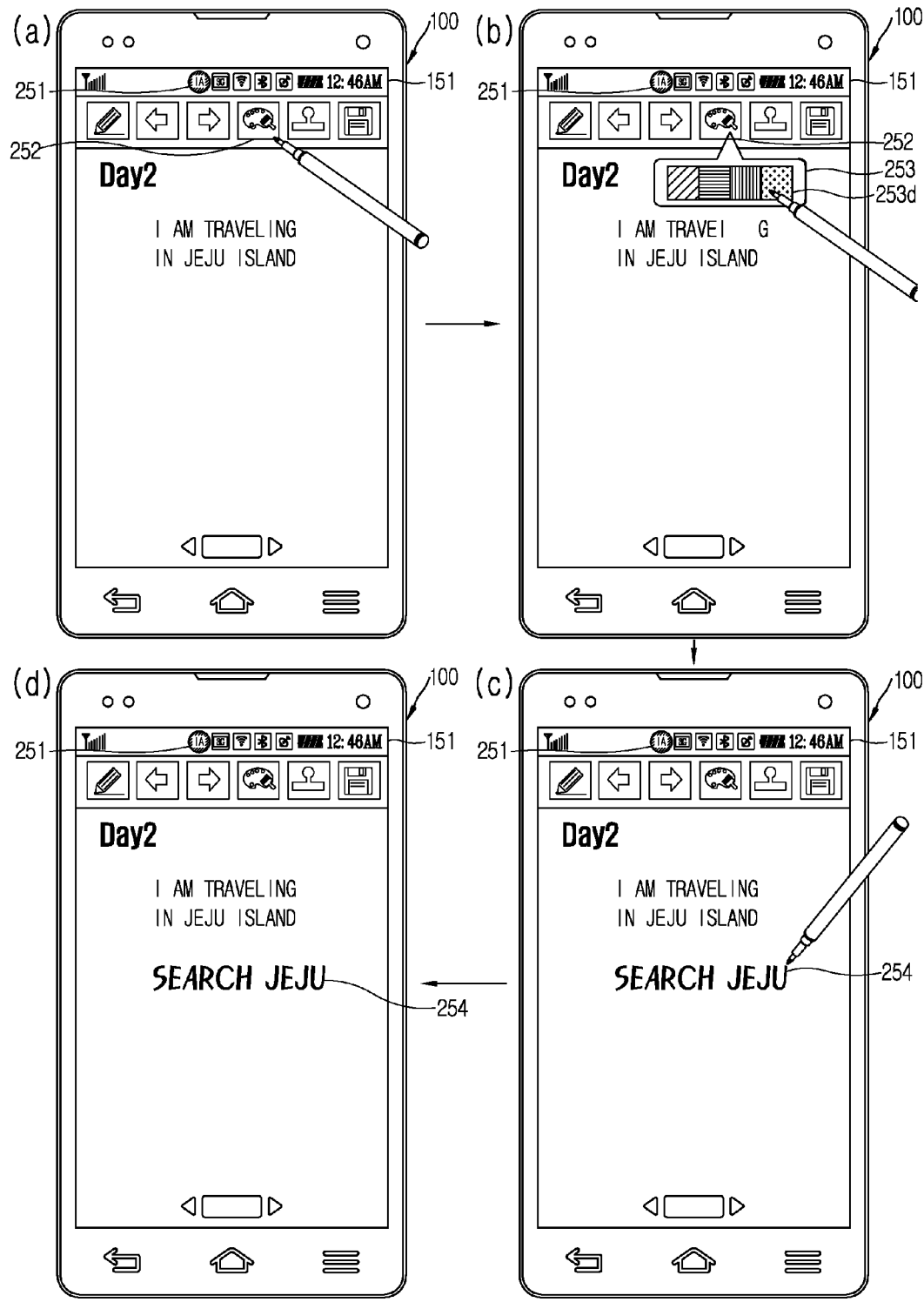

Referring to FIG. 9, when a color selected from the pen tool is different from that of the IA icon 251, the mobile terminal 100 does not perform the foregoing control command.

Specifically, referring to FIGS. 9A and 9B, when the color select icon 252 is selected, the controller 180 may display icons 253 corresponding to a plurality of colors, respectively.

At this time, a color 253d different from that of the IA icon 251 among the icons 253 corresponding to a plurality of colors, respectively, may be selected. When a touch input through the stylus pen 300 is sensed, as illustrated in FIG. 9C, the controller 180 may display the graphic data 254 corresponding to the track of the touch input with the selected color on the display unit 151.

Then, the controller 180 may detect a color as the received attribute information of the graphic data 254. When the color of the graphic data 254 is different from that of the IA icon 251, as illustrated in FIG. 9D, the controller 180 does not execute a function (for example, search function) corresponding to the color of the IA icon 251 for the text data. In other words, the controller 180 may store the received graphic data 254 as image data along with the screen information.

Figure 10:
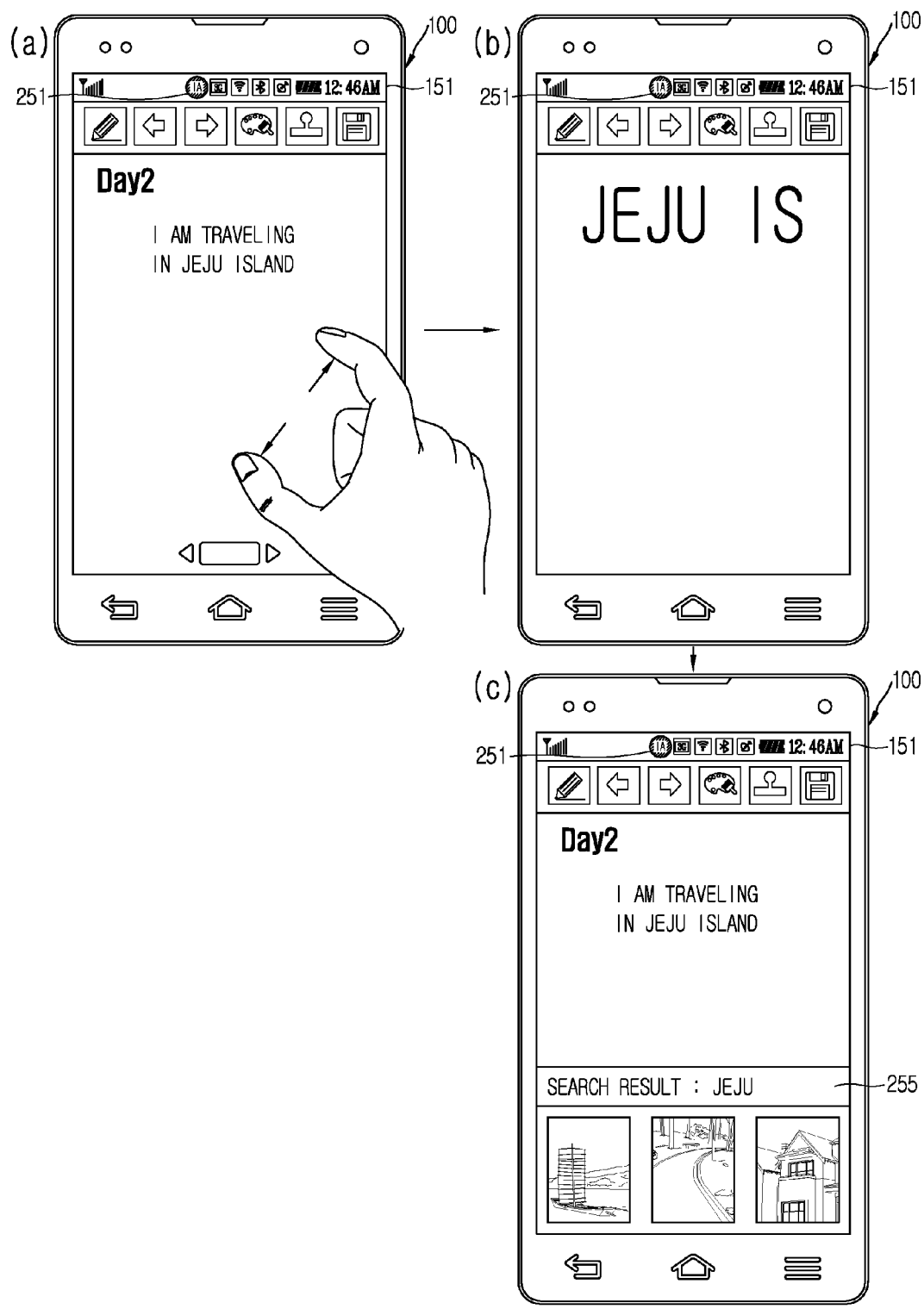
FIG. 10 is a conceptual view illustrating a user interface in which new screen information displayed on the display unit is selected as a region for executing a function.

FIG. 10 is a conceptual view illustrating a user interface in which new screen information displayed on the display unit is selected as a region for executing a function.

Referring to FIG. 10A, the display unit 151 may display screen information. At this time, when screen information is expanded based on a touch input (for example, pinch-in touch input) applied to the display unit 151, referring to FIG. 10B, the controller 180 may display new screen information on the display unit 151 as expanding the screen information.

The controller 180 may select new screen information as a region for executing a function. In other words, the controller 180 may analyze test data (for example, Jeju) displayed on new screen information.

Then, as illustrated in FIG. 10C, the controller 180 may execute a function (for example, search function) corresponding to the IA icon 251 for text data displayed on new screen information, and display the search result 255 in one region of the display unit 151.

Figure 11:
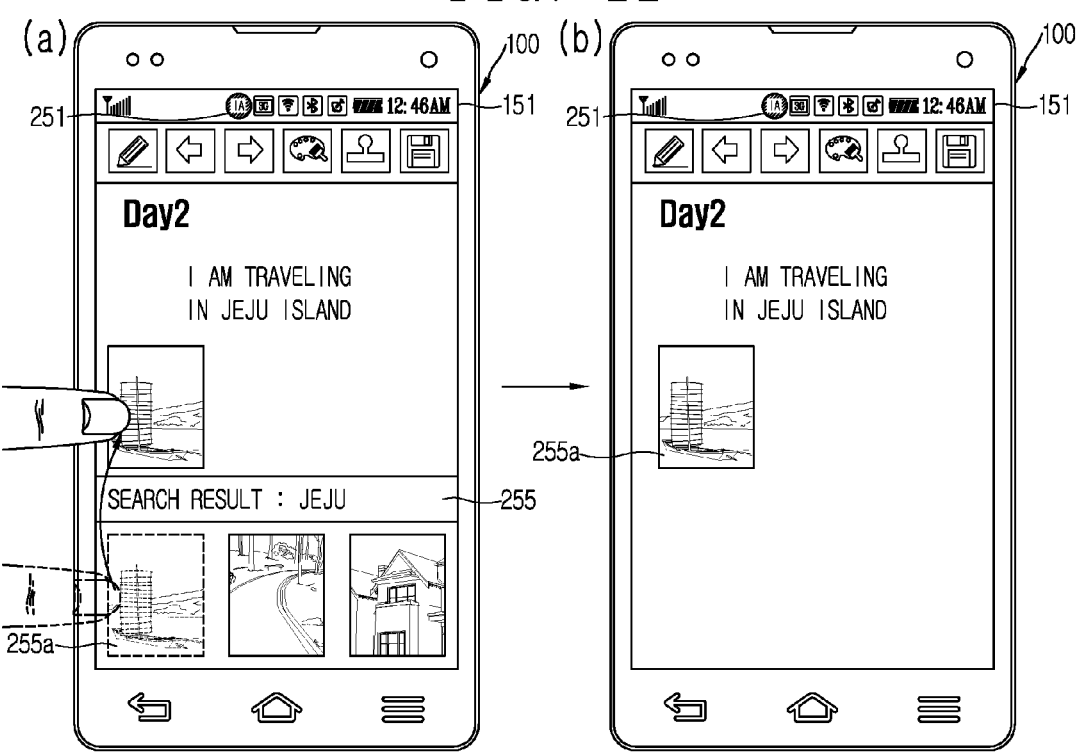
FIG. 11 is a conceptual view illustrating a user interface in which at least part of the search result is inserted into screen information.

FIG. 11 is a conceptual view illustrating a user interface in which at least part of the search result is inserted into screen information.

Referring to FIG. 11A, the display unit 151 may display the search result 255. At this time, when a preset touch input is sensed on the search result 255, for example, when at least part 255a of the search result 255 is dragged in the screen information direction, as illustrated in FIG. 11B, the controller 180 may insert at least part 255a of the search result 255 into the screen information.

Though a drag input is illustrated in the drawing, when a first touch input (for example, short touch input) is sensed on at least part 255a of the search result 255, and a second touch input (for example, short touch input) is sensed in one region of the screen information, the controller 180 may insert at least part 255a of the search result 255 into a position at which the second touch input is sensed.

On the other hand, though not shown in the drawing, an icon (hereinafter, referred to as a "delete icon") corresponding to a function for deleting at least part 255a of the search result 255 may be displayed on the display unit. At this time, when at least part 255a of the search result 255 is dragged in the delete icon direction, the controller 180 may delete at least part 255a of the search result 255.

Then, though not shown in the drawing, when a search function for the same text data is carried out, the controller 180 may display the search result 255 excluding the deleted at least part 255a on the display unit 151.

Figure 12:
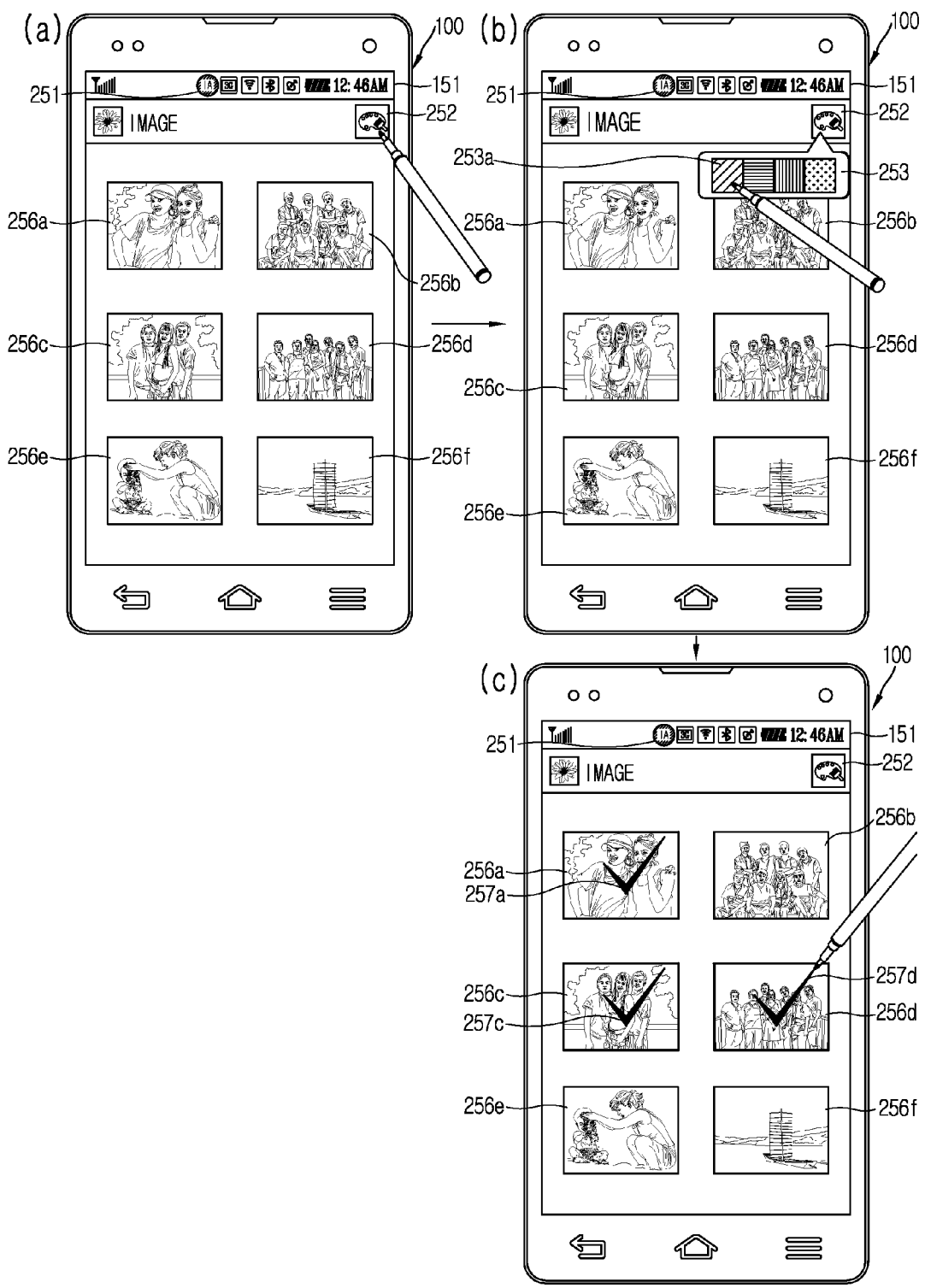
FIGS. 12 and 13 are conceptual view illustrating a user interface in which a plurality of selected objects are grouped.
Figure 13:
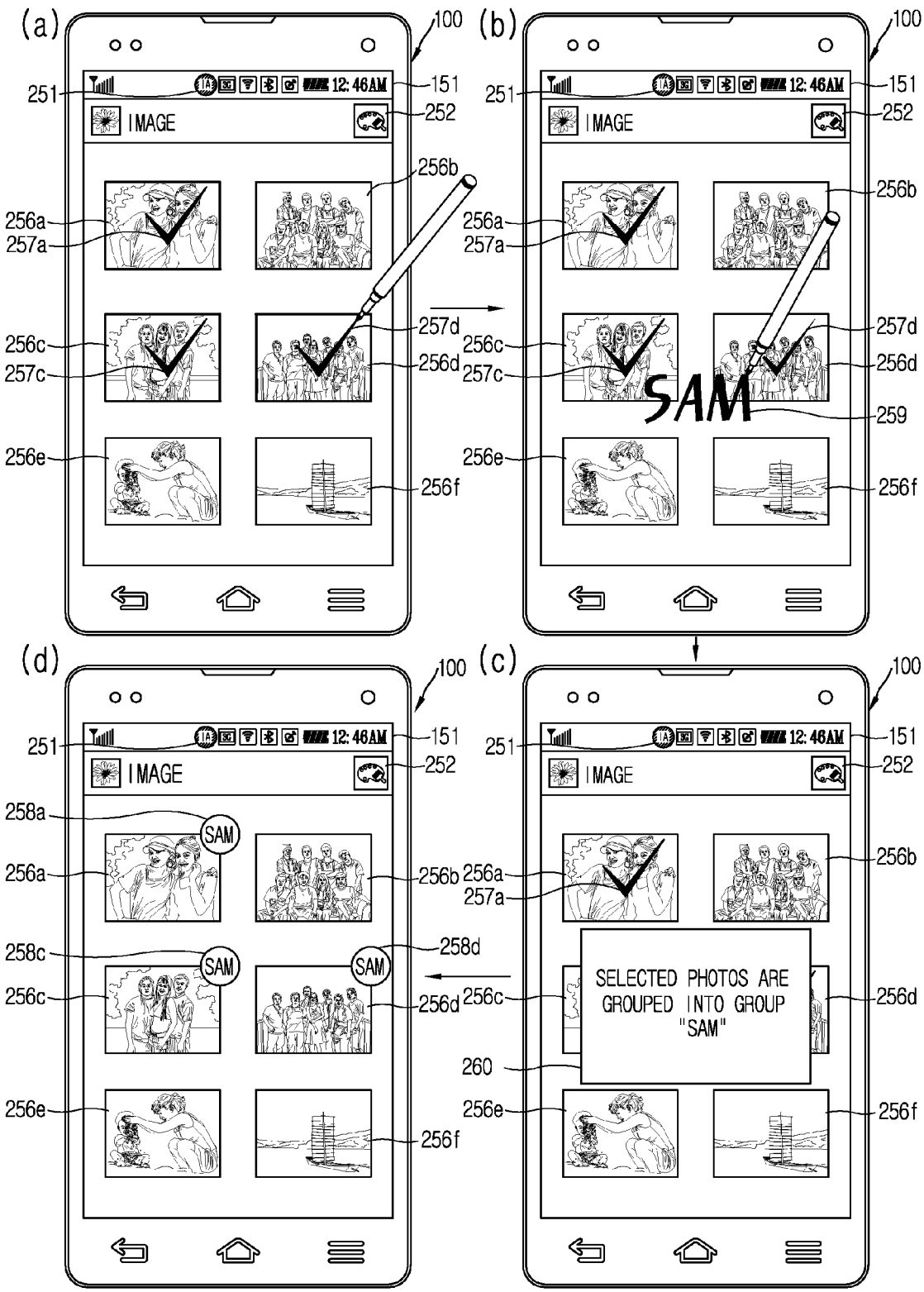

FIGS. 12 and 13 are conceptual view illustrating a user interface in which a plurality of selected objects are grouped.

Referring to FIG. 12A, the display unit 151 may display screen information. The screen information may display a plurality of objects. Here, an object may include at least one of an icon, a widget, a thumbnail image and an application execution menu.

For example, as illustrated in FIG. 12A, the display unit 151 may display a plurality of images (hereinafter, referred to as "first through sixth images") 256a-256f.

Furthermore, the display unit 151 may display the color select icon 252. When the color select icon 252 is selected, as illustrated in FIG. 12B, the controller 180 may display icons 253 corresponding to a plurality of colors, respectively.

When any one 253a of the icons 253 corresponding to a plurality of colors, respectively, is selected, as illustrated in FIG. 12C, the controller 180 may display a plurality of graphic data (hereinafter, referred to as "a first, a third and a fourth graphic data") 257a, 257c, 257d corresponding to the track of a touch input of the stylus pen 300 with the selected color on at least part 256a, 256c, 256d of the plurality of images 256a-256f.

On the other hand, though not shown in the drawing, even when a touch input through the stylus pen 300 is sensed on the IA icon 251, a plurality of graphic data corresponding to the track of a touch input of the stylus pen 300 may be displayed with the color of the IA icon 251 on at least part 256a, 256c, 256d of the plurality of images 256a-256f.

The controller 180 may select a first, a third and a fourth image 256a, 256c, 256d based on the first, the third and the fourth graphic data 256a, 257c, 257d, and group the selected images as one group. Though not shown in the drawing, the controller 180 may display an indicator indicating that the selected images are grouped along with the selected images.

Furthermore, though not shown in the drawing, when graphic data with a plurality of colors are displayed on a plurality of images 256a-256f, the controller 180 may group the plurality of images 256a-256f into a plurality of groups for each color.

Then, referring to FIGS. 13A and 13B, the controller 180 may display graphic data 259 corresponding to the track of a touch input of the stylus pen 300 with the selected color on the display unit 151. When the graphic data 259 corresponds to text data (for example, Sam), the controller 180 may analyze text data.

Furthermore, the controller 180 may detect a color as the received attribute information of the graphic data 259. When the color of the graphic data 259 is the same as a preset color, namely, when the color of the graphic data 259 is the same as that of the first, the third and the fourth graphic data 257a, 257c, 257d, referring to FIG. 13C, the controller 180 may execute a function (for example, a function for grouping them into a group associated with Sam) matched to text data for the first, the third and the fourth image 256a, 256c, 256d. At the same time, the controller 180 may display a popup window 260 for notifying that the first, the third and the fourth image 256a, 256c, 256d are grouped into a group associated with Sam.

Then, referring to FIG. 13D, the controller 180 may display indicators 258a, 258c, 258d indicating that the first, the third and the fourth image 256a, 256c, 256d are grouped into a group associated with Sam along with the first, the third and the fourth image 256a, 256c, 256d. Here, an indicator may include a tag function for Sam. Meanwhile, though an embodiment in which an icon is displayed as an indicator is illustrated in the drawing, the edge of an image may be displayed in a bold manner.

On the other hand, though an embodiment in which a plurality of images are selected based on a plurality of graphic data displayed on the plurality of images, respectively, is illustrated in the drawing, the controller 180 may select a plurality of images contained in a region and group the selected plurality of images even when a region contained in graphic data displayed on the screen information includes the plurality of images.

Furthermore, though a grouping function is illustrated as a function matched to text data in the drawing, the controller 180 may generate an application corresponding to a group subsequent to grouping them, and allow content contained in the selected plurality of images, respectively, to be contained in information associated with the application.

Figure 14:
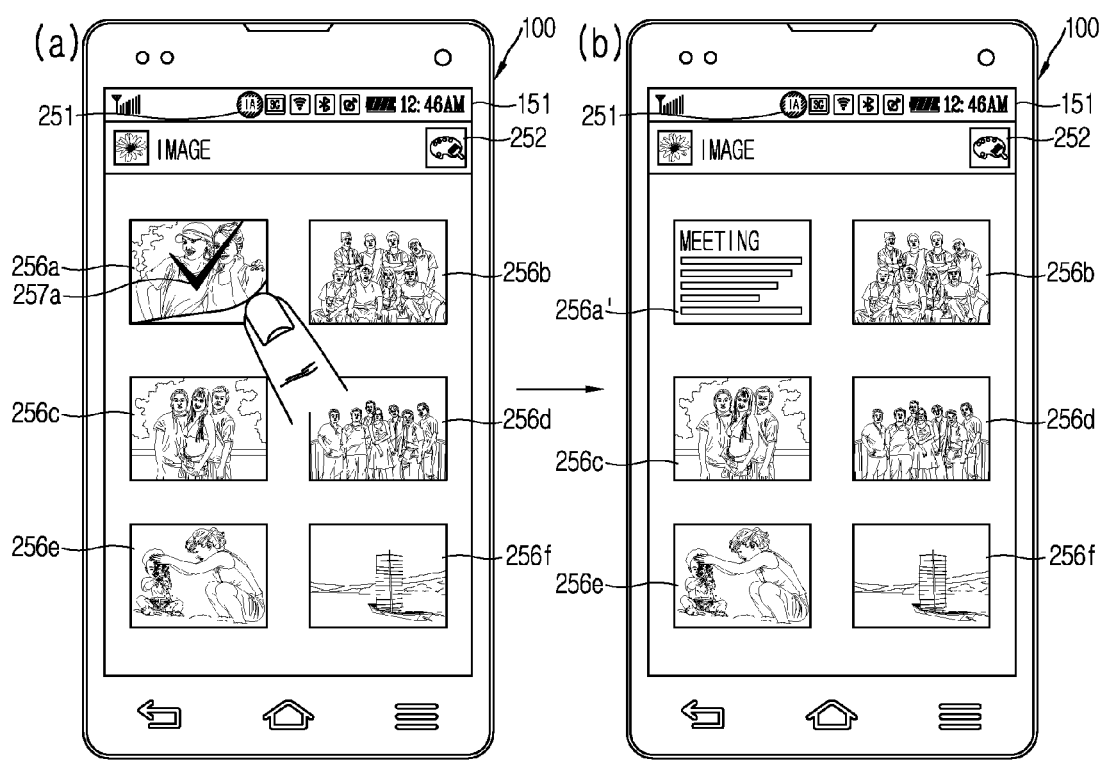
FIG. 14 is a conceptual view illustrating a user interface on which information associated with content contained in a touched object is displayed.

FIG. 14 is a conceptual view illustrating a user interface on which information associated with content contained in a touched object is displayed.

Referring to FIG. 14A, the display unit 151 may display a first through a sixth image 256a-256f as screen information. The controller 180 may display a preset image effect (for example, an effect of part of page being folded) on the first image 256a in which the graphic data 257a has been previously displayed among the first through the sixth image 256a-256f.

Then, when a touch input is sensed on the first image 256a, as illustrated in FIG. 14B, the controller 180 may allow the first image 256a to disappear from the display unit 151, and display information (for example, schedule information) 256a' associated with the content for the first image 256a in a region in which the first image 256a has been displayed. The information may be arranged according to a preset template.

On the other hand, even though the user has not previously displayed the graphic data 257a, the first image 256a may be selected, and information associated with the content for the first image 256a may be stored in connection with the first image 256a according to the user's interest information.

Figure 15:
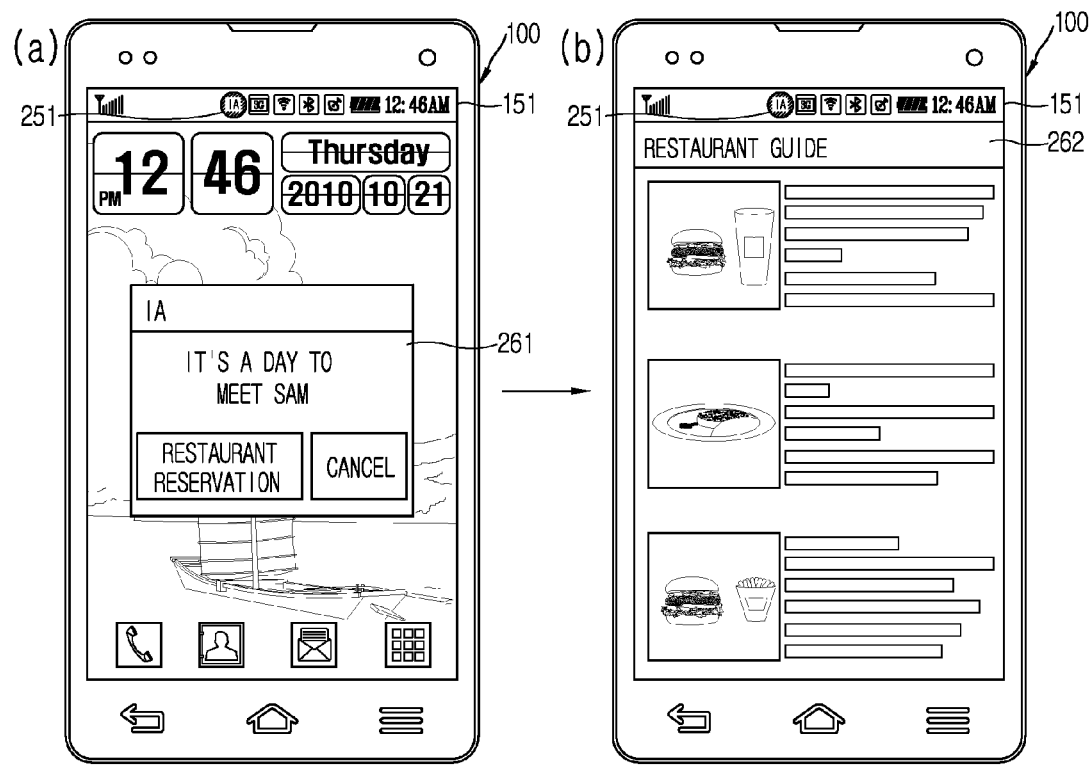
FIGS. 15 and 16 are conceptual views illustrating a user interface on which content associated with current situation information is displayed.
Figure 16:
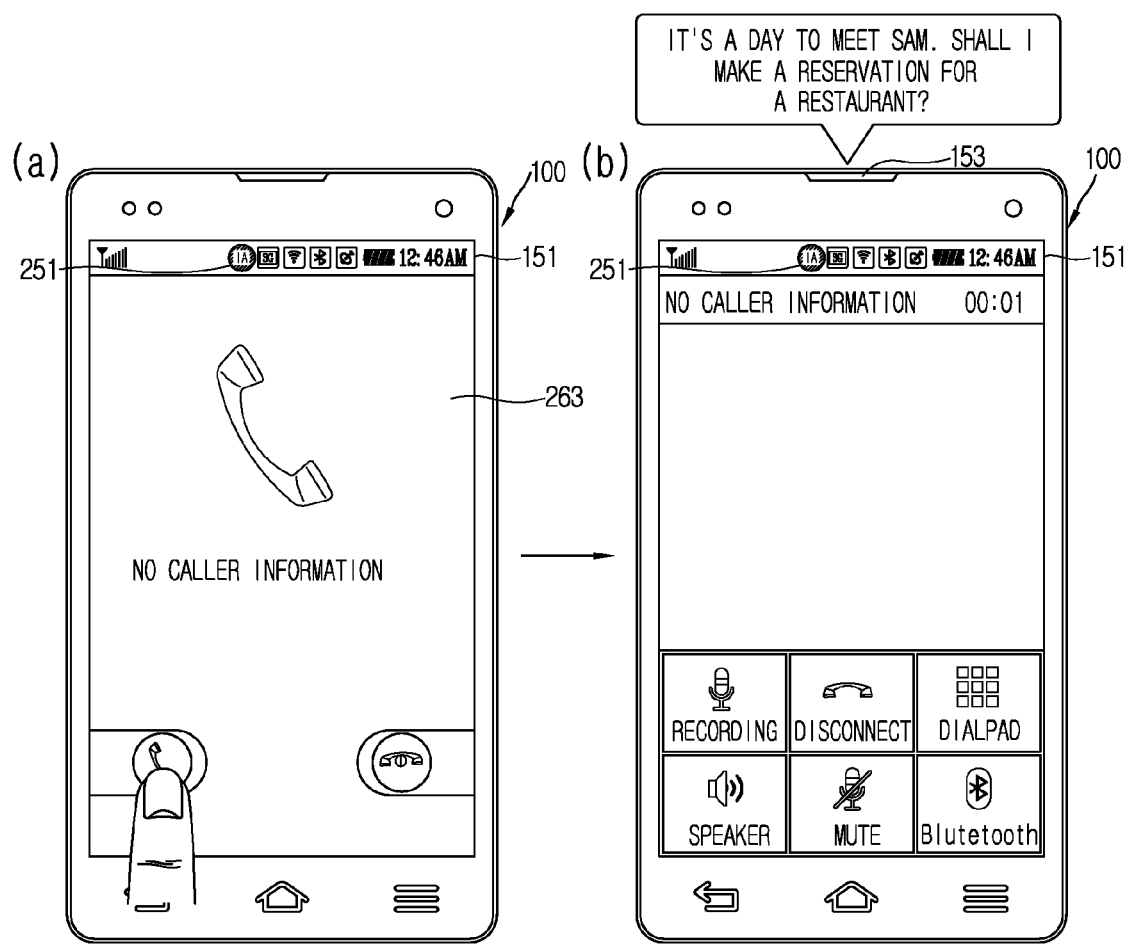

FIGS. 15 and 16 are conceptual views illustrating a user interface on which content associated with current situation information is displayed.

The wireless communication unit 110 (refer to FIG. 1) may receive at least one of current date information, current time information and current location information. The controller 180 may infer current situation information based on at least one of the current date information, current time information and current location information of the body, and extract a content associated with preset situation information when the current situation information corresponds to the preset situation information.

Specifically, referring to FIG. 15A, the controller 180 may display notification information for schedule information based on at least one of the current date information and current time information of the body. The notification information may be displayed in a visual manner through the display unit 151 or may be output in an auditory manner through the audio output module 153 (refer to FIG. 1).

For example, as illustrated in the drawing, the controller 180 may analyze content for the first image 256a in which the user has previously displayed the graphic data 257a, and recognize when a meeting date is set according to the analysis result, and display a popup window 261 indicating that a meeting is scheduled on the display unit 151 when the current date is a meeting date.

Then, the controller 180 may display content 262 associated with restaurant guide on the display unit 151 based on a touch input sensed on the popup window 261 as illustrated in FIG. 15B.

Referring to FIG. 16A, a call signal may be transmitted to the mobile terminal 100 using a virtual number to display notification information on the mobile terminal 100. Accordingly, the mobile terminal 100 may receive the call signal.

Then, referring to FIG. 16B, a server may transmit content associated with schedule information and restaurant guide as audio data to the mobile terminal 100. The mobile terminal 100 may output the content received from the server through the audio output unit 153.

Though not shown in the drawing, the server may transmit content associated with schedule information and restaurant guide as visual data to the mobile terminal 100.

Though an embodiment of outputting content associated with schedule information and restaurant guide is illustrated in the drawing, it may be possible to output content associated with performance schedule notification and public transportation guide.

Furthermore, according to an embodiment disclosed in the present disclosure, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing mobile terminal, and all or part of each embodiment may be selectively combined and configured to make various modifications thereto.

What is claimed is:

1. A mobile terminal, comprising:
   a touch screen configured to display an execution screen of an electronic note application, wherein the execution screen comprises a plurality of icons having a plurality of colors respectively for selecting a color; and
   a controller configured to:
   receive, via the touch screen, a first touch input for selecting an icon among the plurality of icons,
   display, on the execution screen in an overlap manner, graphic data corresponding to a track of a second touch input in a specific color corresponding to the selected icon based on the second touch input,
   determine whether the specific color of the selected icon corresponds to a preset color related to a search function;
   execute the search function for searching data related to the graphic data if the specific color of the selected icon corresponds to the preset color and the graphic data corresponds to text data, and
   display a search result in one region of the touch screen in response to the execution of the search function.

2. The mobile terminal of claim 1, wherein the controller analyses the track of the second touch input as digital data, and displays the graphic data corresponding to the digital data on the touch screen.

3. The mobile terminal of claim 2, wherein the controller selects the text data as a region for executing the search function when the digital data corresponds to the text data, and selects text data contained in a region displayed with the digital data from the screen information as a region for executing the search function when the digital data does not correspond to the text data.

4. The mobile terminal of claim 1, wherein the controller terminates the graphic data corresponding to the track of the second touch input being displayed on the touch screen while displaying the search result in the one region of the touch screen.

5. The mobile terminal of claim 4, wherein when the second touch input is sensed on the search result, the controller inserts at least part of the search result into the screen information based on the sensed touch input.

* * * * *